United States Patent
Itoh et al.

(10) Patent No.: US 9,269,357 B2
(45) Date of Patent: Feb. 23, 2016

(54) SYSTEM AND METHOD FOR EXTRACTING A SPECIFIC SITUATION FROM A CONVERSATION

(75) Inventors: Nobuyasu Itoh, Kanagawa-ken (JP); Gakuto Kurata, Kanagawa-ken (JP); Masafumi Nishimura, Kanagawa-ken (JP)

(73) Assignee: Nuance Communications, Inc., Burlington, MA (US)

( * ) Notice: Subject to any disclaimer, the term of this patent is extended or adjusted under 35 U.S.C. 154(b) by 752 days.

(21) Appl. No.: 12/576,540

(22) Filed: Oct. 9, 2009

(65) Prior Publication Data
US 2010/0114575 A1    May 6, 2010

(30) Foreign Application Priority Data
Oct. 10, 2008    (JP) .................. 2008-263505

(51) Int. Cl.
| | |
|---|---|
| G10L 15/04 | (2013.01) |
| G10L 15/26 | (2006.01) |
| G06F 17/30 | (2006.01) |

(52) U.S. Cl.
CPC .......... *G10L 15/26* (2013.01); *G06F 17/30746* (2013.01)

(58) Field of Classification Search
CPC ... G10L 15/26; G10L 2015/088; G10L 17/26; G10L 15/02
USPC ........................................ 704/251
See application file for complete search history.

(56) References Cited

U.S. PATENT DOCUMENTS

| | | | |
|---|---|---|---|
| 6,064,963 A * | 5/2000 | Gainsboro | 704/270 |
| 6,959,080 B2 | 10/2005 | Dezonno et al. | |
| 7,191,133 B1 * | 3/2007 | Pettay | 704/270 |
| 7,881,446 B1 * | 2/2011 | Apple et al. | 379/114.21 |
| 8,295,446 B1 * | 10/2012 | Apple et al. | 379/88.01 |
| 2003/0129986 A1 * | 7/2003 | Blair et al. | 455/450 |
| 2005/0108775 A1 * | 5/2005 | Bachar et al. | 725/135 |
| 2006/0072727 A1 * | 4/2006 | Bantz et al. | 379/201.04 |
| 2006/0262919 A1 * | 11/2006 | Danson et al. | 379/265.02 |
| 2007/0043608 A1 * | 2/2007 | May et al. | 705/10 |
| 2007/0198284 A1 * | 8/2007 | Korenblit et al. | 705/1 |
| 2008/0271143 A1 * | 10/2008 | Stephens et al. | 726/22 |
| 2009/0043573 A1 * | 2/2009 | Weinberg et al. | 704/223 |
| 2009/0103711 A1 * | 4/2009 | Conway et al. | 379/266.01 |
| 2010/0199189 A1 * | 8/2010 | Ben-Aroya et al. | 715/736 |
| 2011/0082874 A1 * | 4/2011 | Gainsboro et al. | 707/769 |
| 2012/0221336 A1 * | 8/2012 | Degani et al. | 704/250 |

FOREIGN PATENT DOCUMENTS

| | | |
|---|---|---|
| JP | PUPA2004-037989 | 2/2004 |
| JP | PUPA2004-157253 | 6/2004 |

(Continued)

*Primary Examiner* — Jakieda Jackson
(74) *Attorney, Agent, or Firm* — Hamilton, Brook, Smith & Reynolds, P.C.

(57) ABSTRACT

A system, method, and computer readable article of manufacture for extracting a specific situation in a conversation. The system includes: an acquisition unit for acquiring speech voice data of speakers in the conversation; a specific expression detection unit for detecting the speech voice data of a specific expression from speech voice data of a specific speaker in the conversation; and a specific situation extraction unit for extracting, from the speech voice data of the speakers in the conversation, a portion of the speech voice data that forms a speech pattern that includes the speech voice data of the specific expression detected by the specific expression detection unit.

15 Claims, 4 Drawing Sheets

(56) References Cited

FOREIGN PATENT DOCUMENTS

| JP | PUPA2004-252668 | 9/2004 |
| JP | PUPA2005-242891 | 9/2005 |
| JP | 2006267464 A2 | 10/2006 |
| JP | PUPA2007-033754 | 2/2007 |
| JP | PUPA2007-212532 | 8/2007 |
| JP | 2007286097 A2 | 11/2007 |
| JP | PUPA2007-286097 | 11/2007 |

* cited by examiner

SYSTEM AND METHOD FOR EXTRACTING A SPECIFIC SITUATION FROM A CONVERSATION

CROSS-REFERENCE TO RELATED APPLICATION

This application claims priority under 35 U.S.C. §119 from Japanese Patent Application No. 2008-263505 filed on Oct. 10, 2008, the entire contents of which are incorporated herein by reference.

BACKGROUND OF THE INVENTION

1. Field of the Invention

The present invention relates to a system and method for analyzing a conversation. More particularly, the present invention relates to a system and method for extracting a specific situation from a conversation by analyzing voices in the conversation.

2. Description of Related Art

Obtaining information by analyzing recorded voices has previously been performed. Methods for analyzing the voices in a phone conversation or in a meeting and for deriving speaker identification or situation of the conversation based on the voices or speech patterns obtained from voice recognition have been proposed before.

For example, Japanese Patent Application Publication No. 2006-267464 discloses a technology for separating voice data into a speech portion and a non-speech portion by use of voice power information and for checking the degree of confusion of a speaker based on the proportion of the non-speech portion within a certain period of time.

Japanese Patent Application Publication No. 2007-286097 discloses technology for detecting the occurrence of a compliant in a call reception operation conducted by an agent at a call center in accordance with the number of supportive responses in the voice of the agent at the call center within a certain period of time.

SUMMARY OF THE INVENTION

For specific conversations, such as a conversation over the phone between the agent at a call center and a client, or a conversation between a sales person and a client in face-to-face selling, a specific situation that has occurred may be determined and extracted according to an embodiment of the present invention. For example, such situations include the response to a complaint from the client, interactions when the client is interested in a product or decides to purchase the product. It is an object of the present invention to automatically locate where a specific situation has occurred in a conversation in a specific scene by analyzing voices in the conversation.

Therefore, in a first aspect of the present invention, there is provided a system for extracting a specific situation in a conversation. The system includes: an acquisition unit for acquiring speech voice data of speakers in the conversation; a specific expression detection unit for detecting the speech voice data of a specific expression from speech voice data of a specific speaker in the conversation; and a specific situation extraction unit for extracting, from the speech voice data of the speakers in the conversation, a portion of the speech voice data that forms a speech pattern that includes the speech voice data of the specific expression detected by the specific expression detection unit.

In another aspect of the present invention, there is provided a method implemented by a computing apparatus for extracting a specific situation by analyzing a conversation. The method includes the steps of: acquiring, by an acquisition unit, speech voice data of the speakers in the conversation; detecting, by a specific expression detection unit, the speech voice data of a specific expression from speech voice data of a specific speaker in the conversation; and extracting, by a specific extraction unit, from the speech voice data of the speakers in the conversation, a portion of the speech voice data that forms a speech pattern that includes the speech voice data of the specific expression, thereby extracting the specific situation by analyzing the conversation by the computing apparatus.

In still another aspect of the present invention, there is provided a computer readable article of manufacture tangibly embodying computer readable instructions for executing the computer implemented method.

BRIEF DESCRIPTION OF THE DRAWINGS

For a more complete understanding of the present invention and its advantages, reference is now made to the following description taken in conjunction with the accompanying drawings.

DETAILED DESCRIPTION OF THE PREFERRED EMBODIMENTS

With reference to the accompanying drawings, embodiments of the present invention are described in detail below.

Figure 1:
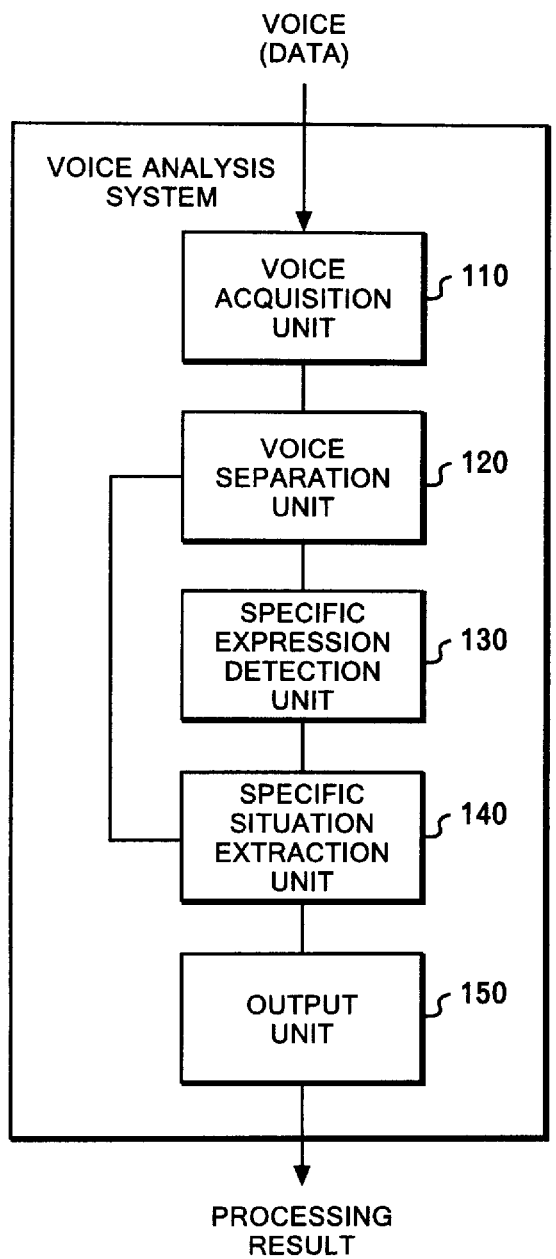
FIG. 1 is a diagram showing a configuration of a voice analysis system according to an embodiment of the present invention.

FIG. 1 is a diagram showing a configuration example of a voice analysis system according to an embodiment of the present invention. With reference to FIG. 1, the system according to the embodiment of the present invention includes: a voice acquisition unit 110 for acquiring conversation voice data; a voice separation unit 120 for identifying a speaker in the conversation voice data acquired; and a specific expression detection unit 130 for detecting a specific expression from a speech of a specific speaker. In addition, the system also includes: a specific situation extraction unit 140 for extracting a specific situation in a conversation, based on a speech pattern of each speaker and the detected specific expression; and an output unit 150 for outputting a result of the analysis processing described above.

Figure 2:
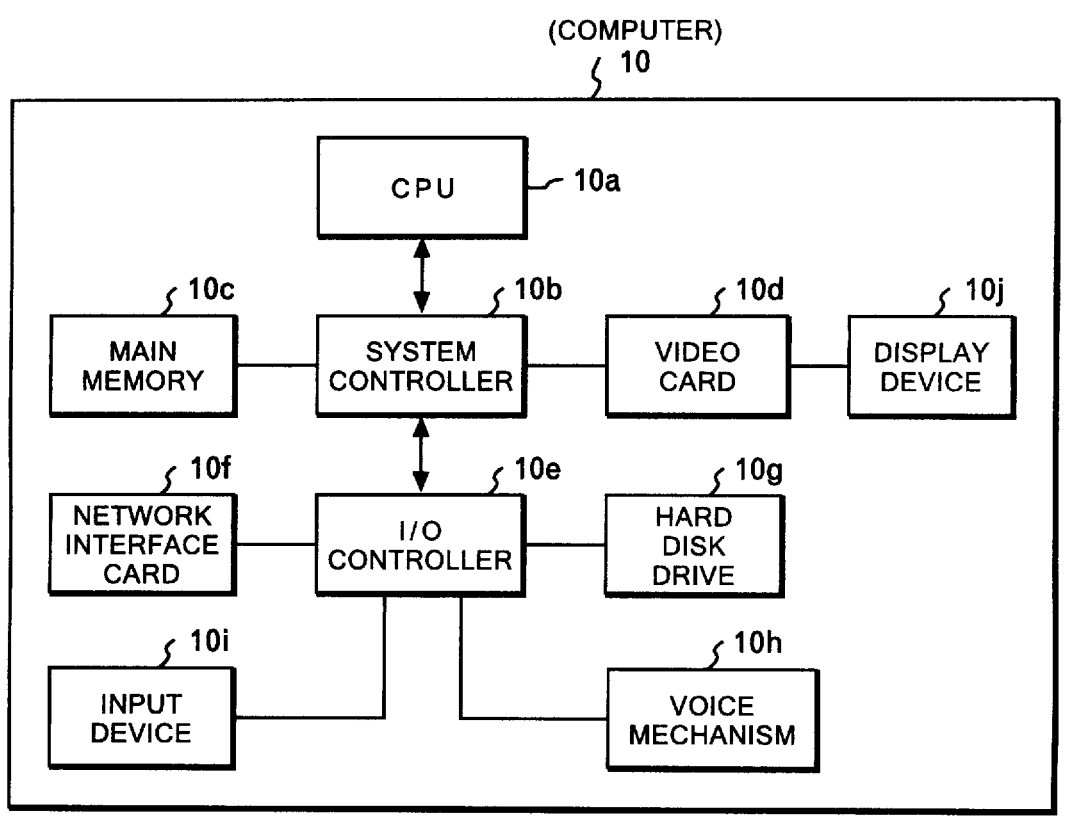
FIG. 2 is a diagram showing a hardware configuration of a computer apparatus which implements the voice analysis system shown in FIG. 1.

FIG. 2 is a diagram showing a hardware configuration example of a computer which implements the voice analysis system shown in FIG. 1. The computer apparatus 10 shown in FIG. 2 includes: a CPU (Central Processing Unit) 10a as computing means; a main memory 10c; and a hard disk drive (HDD) 10g as a storage means. In addition, the computer also includes: a network interface card 10f for connection to an external device through a network; a video card 10d; a display device 10*j* for displaying output; and a voice mechanism 10*h* for providing voice output. The computer further includes an input device 10*i* including a keyboard and a mouse.

As shown in FIG. 2, the main memory 10*c* and the video card 10*d* are connected to the CPU 10*a* through a system controller 10*b*. Additionally, the network interface card 10*f*, the hard disk drive 10*g*, the voice mechanism 10*h*, and the input device 10*i* are connected to the system controller 10*b* through an I/O controller 10*e*. These constituent components are connected to each other through various buses such as a system bus and an I/O bus. For example, the CPU 10*a* and the main memory 10*c* are connected to each other through a system bus and a memory bus. In addition, the CPU 10*a* and the hard disk drive 10*g*, the network interface card 10*f*, the video card 10*d*, the voice mechanism 10*h*, the input device 10*i* and the like are connected to each other through I/O buses, which can include a PCI (Peripheral Components Interconnect), a PCI Express, a serial ATA (AT Attachment), a USB (Universal Serial Bus) and an AGP (Accelerated Graphics Port).

Note that FIG. 2 shows an example of a suitable computer apparatus hardware configuration by which an embodiment of the present invention is performed. The actual system is not limited to the configuration shown in FIG. 2. For example, the computer apparatus may be configured to have only a video memory installed instead of the video card 10*d*, and to process image data by the CPU 10*a*. In addition, the voice mechanism 10*h* may be included in the computer not as an independent component but as a function of a chip set constituting the system controller 10*b* and the I/O controller 10*e*. Moreover, as an auxiliary storage device, drives using various disks as media, for example, an optical disk or a flexible disk, may be provided other than the hard disk drive 10*g*. As the display device 10*j*, a liquid crystal display can be used but any type of display can be used, including a CRT display or a plasma display device.

In the system shown in FIG. 1, the voice separation unit 120, the specific expression detection unit 130 and the specific situation extraction unit 140 are implemented by the CPU 10*a* that executes programs read into the main memory 10*c* in the computer 10 shown in FIG. 2, for example. Additionally, the voice acquisition unit 110 and the output unit 150 are implemented by the network interface card 10*f* and the program-controlled CPU 10*a* in the computer 10 shown in FIG. 2, for example.

The voice acquisition unit 110 acquires voice data for a phone conversation or for a meeting recorded by a voice input device such as a microphone. In the case of acquiring voice data for a conversation over the phone, voice data on at least one speaker may be acquired through a telephone line. When the speech of the speakers are recorded on channels set for each of the speakers, the voice acquisition unit 110 acquires voice data for each channel.

The voice separation unit 120 separates the voice data acquired by the voice acquisition unit 110 into the speech voices of each of the speakers. When the acquired voice data is recorded on an individual channel for each speaker, the speaker is identified for each channel. Moreover, when voices of multiple speakers are mixed on one channel, each of the speakers may be identified by applying an existing technology for identifying the speech of each speaker from voice data that includes the voices of multiple speakers.

The specific expression detection unit 130 detects a specific expression from the speech voice of a specific speaker among the voice data. Each specific speaker is identified by the voice separation unit 120. A speaker and an expression to be detected are set according to the situation to be extracted from the conversation voice data. For example, in the case of extracting a situation where an agent is responding to a complaint from a client when handling phone calls at a call center, an apologizing expression, such as "I am sorry", "Excuse me", and "I apologize" spoken by the agent is detected.

Any existing method for detecting a specific expression can be employed for recognition of the contents of a speech from voice data. For example, the specific expression described above can be detected from text obtained as a result of recognizing speech contents by use of general voice recognition technology. In an embodiment of the present invention, it is only necessary to detect the specific expression. Voice recognition is not required to be performed for the entire voice data that has been acquired. Thus, a keyword spotting technology may be used. Keyword spotting is a technology for recognizing a specific keyword by extracting only the specific keyword from among continuous voices. By use of this technology, a voice waveform of a specific expression to be detected is prepared and checked against the voice data acquired. Thus, the location where the specific expression is spoken is detected.

Additionally, in an actual speech, even similar apologizing expressions can differ. For example, "Sorry", "I am sorry" and "I am very sorry" can be used. Therefore, for example, a specific expression such as "sorry" is specified for the expression. Thus, all of the above expressions are set to be detected.

The specific situation extraction unit 140 extracts a portion of the conversation where a speech pattern of each speaker identified by the voice separation unit 120 meets certain conditions from the conversation voice data to be processed. Specifically, the portion described above includes the speech voice of the specific expression given by the specific speaker detected by the specific expression detection unit 130. The portion is extracted as the portion where a specific situation has occurred in the conversation. When the specific situation has occurred in the conversation, a pattern in which the speech of each speaker meets certain conditions may be formed in the conversation. A specific speech expression given by a specific speaker may appear in the speech pattern. With this taken into consideration, the specific situation extraction unit 140 specifies and extracts the portion of the conversation where the specific situation has occurred in the conversation by detecting a combination of the speech pattern and the speech expression from the conversation voice data.

As an example, consider the situation of responding to a complaint from a client described above, referred to as a complaint responding situation. In this case, a frequently-appearing speech pattern is a pattern in which an apologizing expression spoken by the agent appears after a continuous state where the client speaks more than the agent. This corresponds to a situation where the agent expresses words of apology only after the client complains. Here, the system extracts complaint responding situations based only on the apologizing expression spoken by the agent, without considering the state where more speaking is done by the client.

The apologizing expression is an expression used by the speaker to express his or her apology, but is not always used for apologizing for the complaint from the client. As an example of the use of the apologizing expression for other purposes than to apologize for the complaint, there are examples of using an expression "I'm sorry to have kept you waiting" for keeping someone waiting and an expression "I'm sorry about the other day" for missing someone's telephone call or causing an inconvenience for someone. The apologizing expressions used in these situations often appear with a greeting in the beginning of the entire conversation.

Moreover, there is the example of using an expression "I hate to trouble you, but . . . " when requesting someone to do something. In this case, it is a characteristic of speech about the contents of the request that includes use of an adversative sentence after the apologizing expression. This does not necessarily correspond to the pattern in which the apologizing expression appears after more speaking is done by the client. Furthermore, there are people who relatively frequently say such words of apology for the purpose of, for example, facilitating communication in an actual conversation. Therefore, if the system extracts a specific situation from the conversation based on only the apologizing expression given by the agent, those apologizing expressions used for other purposes than to apologize for the complaint are also extracted.

With this taken into consideration, the specific situation extraction unit 140 extracts the complaint responding situation on the condition that a combination of the speech pattern, in which the condition that more speaking is done by the client continues and then speaking by the agent appears, and the apologizing expression, or specific expression, spoken by the agent appears. As described above, specific situations occurring in the conversation are determined based on a combination of the speech pattern of each speaker and the specific expression given by the specific speaker. Thus, extraction accuracy for the specific situation is improved.

The method for extracting the specific situation according to an embodiment of the present invention can be used for extracting various specific situations from conversations in various scenarios, other than for extracting the complaint responding situation as described above. An example is the case where a state of the conversation with more speaking by the client continues and then a gratitude expression, for example "Thank you", spoken by the agent appears in a conversation for buying and selling products. It is then possible to determine that there has occurred a situation where the client has purchased the product. Moreover, in the case where a state with more speaking by one speaker continues and then an approval expression, such as "Certainly", "You got it", or "All right", spoken by the other speaker appears, it is possible to determine that there has occurred a situation where some kind of instruction has been given from one speaker to the other speaker.

In an embodiment of the present invention, the speech pattern of each speaker used for extraction of the specific situation is formed of external characteristics not associated with speech contents, such as speech time, speech order, and the number of speech instances for each speaker. Such information about the speech can be acquired alone from acoustic information, power, in the voice data acquired by the voice acquisition unit 110.

To be more specific, if there is information on the speech time of each speaker along a time axis, the speech pattern can be specified. Therefore, except for detection of a specific expression spoken by a specific speaker, in an embodiment of the present invention, voice recognition processing is not required to be performed for the speech of each speaker. Also, it is not necessary to save the voice data itself after the information on the speech time described above is acquired.

For example, in the example of the call center described above, it is only necessary to acquire information on the time at which the client's speech took place based on the power of the voice of the speech. Thus, recognition of the contents of the client's speech is not required. Generally, in the case of doing voice recognition for conversation voices over the phone at the call center, it is known that the recognition rate of the speech voice of the client is lower than that of the speech voice of the agent. Even in such a case, an embodiment of the present invention which does not require recognition of the speech voice of the client is particularly effective.

The specific situation extraction unit 140 according to an embodiment of the present invention may extract a portion of the conversation where a specific situation may have occurred in the conversation voice data and present information for determining whether or not the specific situation has occurred, besides explicitly specifying the location where the specific situation has occurred as described above. In this case, first, the location where a specific expression given by a specific speaker has appeared is specified.

In a portion of the conversation voice data including its specified location, a characteristic value quantitatively representing external characteristics of the portion of the conversation is obtained and presented as information for determining whether or not the specific situation has occurred. This information includes accuracy and degree of certainty of occurrence of the specific situation. When the location where the specific situation has occurred is explicitly specified from the conversation voice data, first, accuracy of the portion including the location where the specific expression spoken by the specific speaker has appeared is obtained. After that, when the accuracy is equal to or higher than a predetermined threshold, the portion of the conversation may be extracted as the location where the specific situation has occurred.

Note that, the characteristic value to be set is obtained according to the type of calculation used for extraction of the portion that forms the type of speech pattern to be extracted from the speech voice data. Moreover, the speech pattern to be extracted from the speech voice data may be set according to the specific situation in a particular kind of conversation.

The output unit 150 outputs the result of the processing executed by the specific situation extraction unit 140. The processing result may simply present the location from which the specific situation is extracted or may present the characteristic value described above. Furthermore, the processing result may also present, as an extraction result, only the locations where the accuracy calculation result exceeds a certain threshold among those where the specific situations are extracted.

In addition, the output unit 150 outputs the processing result in various output formats according to a mode of implementing the system. Specifically, for example, the result of the processing executed by the specific situation extraction unit 140 may be visualized as a graph format or a table format and displayed on the display device 10*j* shown in FIG. 2. Moreover, this processing result may be stored in a database constructed on the hard disk drive 10*g* or an external storage device. Furthermore, the processing result may be processed into a data format that can be used in various applications and provided for use in the applications.

Figure 3:
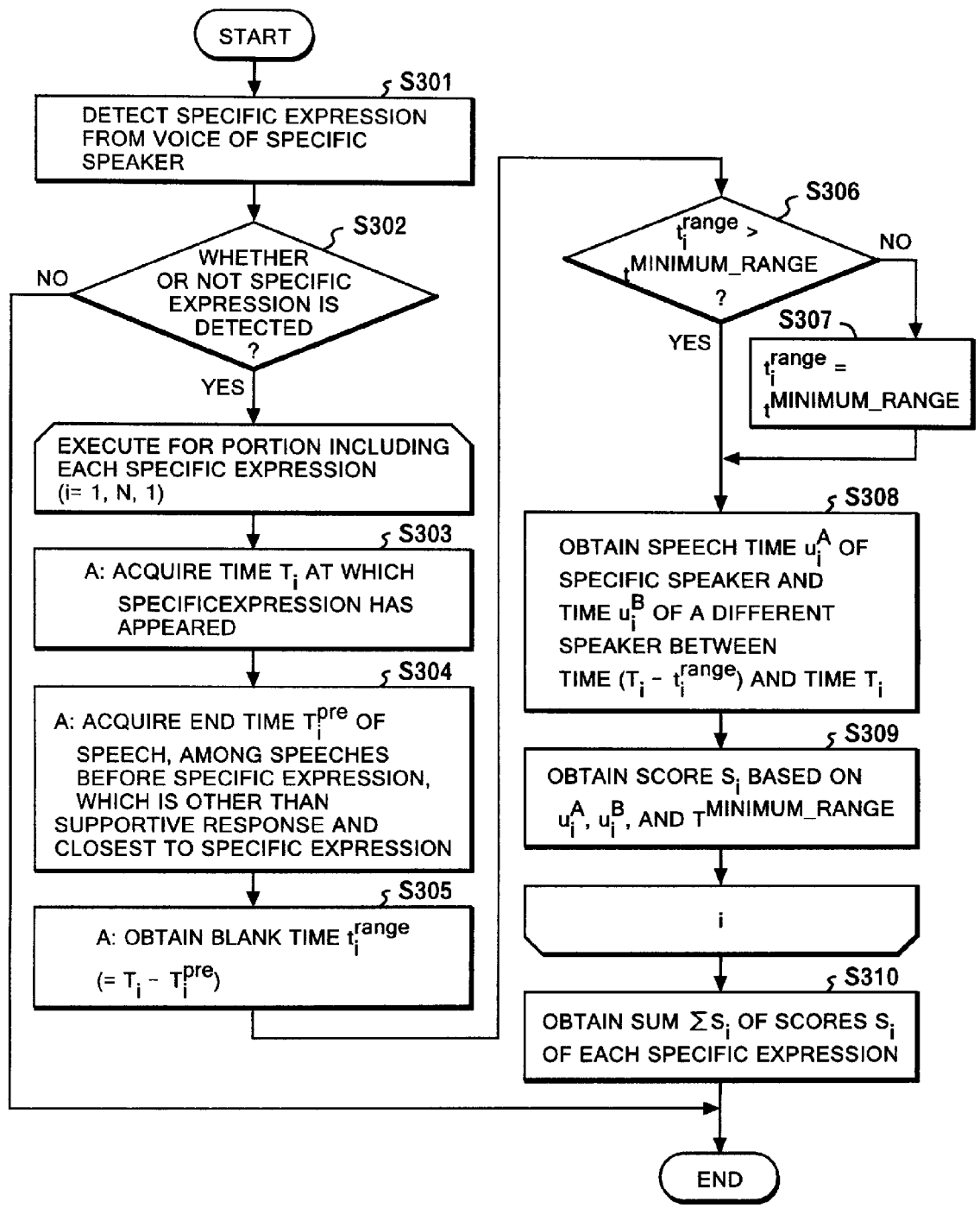
FIG. 3 is a flowchart showing operation procedures executed by a specific expression detection unit and a specific situation extraction unit according to an embodiment of the present invention.

Next, the operation of the specific expression detection unit 130 and the specific situation extraction unit 140 will be described. FIG. 3 is a flowchart showing procedures for detecting a specific expression of a specific speaker from conversation voice data by the specific expression detection unit 130 and for extracting a specific situation by the specific situation extraction unit 140.

Here, processing is performed by using voice data in a certain set of conversations as a unit, such as one phone call at a call center, referred to as a conversation unit. Moreover, conversation voice data in one conversation unit includes one or several speech instances of each speaker. Note that, in the flowchart of FIG. 3, each of the expressions "A:" represents processing for the voice of a specific speaker, for example, the agent in the example of the call center described above.

In this operation example, a speech pattern is adopted to be extracted as a portion of the conversation where a specific situation has occurred. Specifically, the speech pattern is a pattern in which an apologizing expression spoken by the agent appears, after a continuous state where more speaking is done by the other person than by the agent who is the specific speaker.

Moreover, in this operation example, the specific situation extraction unit 140 does not specify a portion where the specific situation has occurred in the conversation voice data. Instead, the specific situation extraction unit 140 obtains a characteristic value quantitatively representing external characteristics of speech voice data for each of the portions including specific expressions of the specific speaker in the speech voice data. In other words, the specific situation extraction unit 140 extracts, from the conversation voice data, portions where specific situations may have occurred, and obtains the characteristic value for each of the portions extracted. Thus, the specific situation extraction unit 140 represents the accuracy for which the specific situation has actually occurred in each of the portions.

As shown in FIG. 3, the specific expression detection unit 130 detects a specific expression from voice data for the specific speaker, among the voice data of the conversation unit classified for each speaker by the voice separation unit 120, Step 301. As described above, detection of the specific expression can be performed by use of existing recognition technology such as voice recognition processing or keyword spotting. Here, when no specific expression is detected from the voice data for the specific speaker, when there is no specific expression, in the conversation unit to be processed, the processing is terminated, "No" in Step 302.

On the other hand, when the specific expression is detected, "Yes" in Step 302, the specific situation extraction unit 140 performs the following Steps 303 to 309 for a portion of the conversation including each of the specific expressions detected in the voice data of the conversation unit. Note that it is assumed that N specific expressions have been detected from the voice data of the conversation unit to be processed. Moreover, in the following description, the subscript suffix "i" attached to the reference numeral of each variable takes a value 1 to N and indicates that each processing is performed for an i-th specific expression.

The specific situation extraction unit 140 first acquires, from the voice data of the conversation unit, a time $T_i$ at which a specific expression has appeared based on the time axis of the voice data, Step 303. Then, the specific situation extraction unit 140 acquires an end time $T_i^{pre}$ of a speech segment, which is other than a supportive response and closest to the specific expression, Step 304, among the speech instances of the specific speaker before the specific expression. Here, the supportive response is usually a simple and short characteristic speech segment such as "Yes" or "Uh-huh". Thus, by ignoring such a speech segment, the speech immediately before the specific expression other than the supportive response can be specified. When keyword locating is used for detecting the specific expression, the time $T_i^{pre}$ can be obtained by referring to the result of VAD (Voice Activity Detection).

Next, the specific situation extraction unit 140 uses the time $T_i$ and the time $T_i^{pre}$ to obtain a time range, $t_i^{range} = T_i - T_i^{pre}$, between the specific expression spoken by the specific speaker and the speech segment immediately before it, Step 305. This time between the specific expression and the speech immediately before it, is a time for which the specific speaker remains silent except for the supportive response, and is referred to as a blank time. During this blank time, a speaker other than the specific speaker is assumed to be speaking. However, in the step of obtaining the blank time $t_i^{range}$, it does not matter whether or not a different speaker is actually speaking.

Moreover, when the obtained blank time $T_i^{range}$ is shorter than a preset minimum value $t^{MINIMUM\_RANGE}$, the specific situation extraction unit 140 replaces the value of the blank time $t_i^{range}$ by the minimum value $t^{MINIMUM\_RANGE}$ Steps 306 and 307. This is performed to avoid a situation for which the blank time $t_i^{range}$ is much reduced when an additional word is spoken immediately before the specific speaker speaks the specific expression or when a noise is erroneously recognized as speech of the specific speaker. The additional word is "very", for example, in the case where the specific speaker has spoken "I am very sorry" when the specific expression is an apologizing expression "I am sorry." While an actual example of the minimum value $t^{MINIMUM\_RANGE}$ can be, for example, about 5 seconds, an appropriate value may be individually set according to the scenario of the conversation to be processed or a specific situation to be extracted.

In an embodiment of the present invention, by use of a speech pattern formed of the portion of the speech voice data obtained in the above Steps 306 and 307, that is, a portion from the time, $T_i - t_i^{range}$, to the time $T_i$, the portion where the specific situation may have occurred is extracted.

Then, the specific situation extraction unit 140 obtains a time $u_i^A$ for which the specific speaker is speaking and a time $u_i^B$ for which a different speaker is speaking by referring to the speech voice data for each speaker between the time, $T_i - t_i^{range}$, and the time $T_i$, Step 308. The speech time $u_i^A$ for the specific speaker can be obtained by using a voice recognition result or a result of VAD processing for the speech voice of the specific speaker. Meanwhile, the speech time $u_i^B$ for the different speaker can be obtained by using a result of VAD processing for speech voice data for the speaker.

Subsequently, based on the speech times $u_i^A$ and $u_i^B$ for each of the speakers obtained in Step 308 and the minimum value $t^{MINIMUM\_RANGE}$ of the blank time, the specific situation extraction unit 140 obtains a score $S_i$ as a characteristic value for an i-th specific expression, Step 309. The score $S_i$ as the characteristic value is used as an index indicating accuracy at which a specific situation actually occurs in a location where the specific expression has appeared in the voice data. Specifically, the higher the score $S_i$ for a certain location, the higher is the accuracy for which the certain location is identified as a location where the specific situation has actually occurred. When the specific expression is an apologizing expression, the higher the score $S_i$, the higher the accuracy at which a complaint responding situation occurs. Thus, the specific expression is regarded as an apologizing expression used to apologize for a more serious problem.

A method for calculating the score $S_i$ can depend on the actual contents of the specific situation. As one example, it is possible to set the method for calculating the score $S_i$ in such a manner that the longer the time $t_i^{range}$, the higher the score $S_i$ and the longer the speech time of the different speaker compared with the speech time of the specific speaker within the time $t_i^{range}$, the higher the score $S_i$. The following equation is an example of a calculation equation for obtaining the score $S_i$:

$$S_i = (u_i^B - u_i^A)/t^{MINIMUM\_RANGE}. \qquad \text{Equation (1)}$$

This score $S_i$ is set to a maximum value 1 when $t_i^{range} = t^{MINIMUM\_RANGE}$ and $u_i^A = 0$, that is, only the speaker other than the specific speaker is speaking within the blank time immediately before the specific expression.

Figure 4:
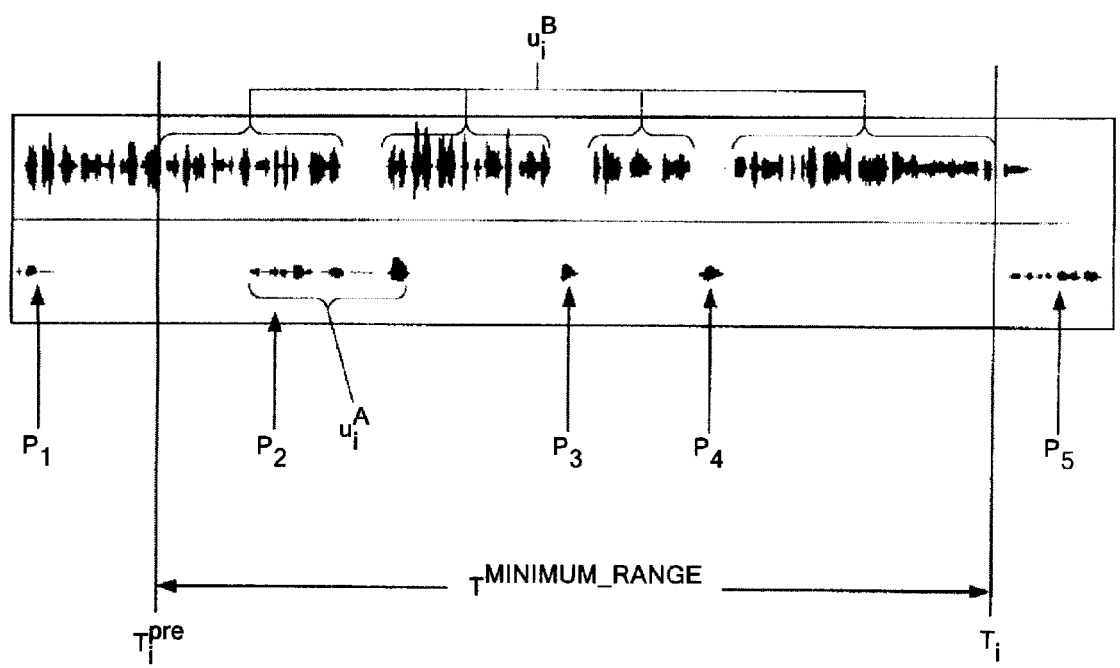
FIG. 4 is a diagram showing an actual example of conversation voice data of a client and an agent in a call center, the data being processed according to an embodiment of the present invention.

FIG. 4 is a diagram showing an actual example voice data from a conversation for a client and an agent at a call center.

In FIG. 4, a speaker A is the agent and a speaker B is the client. Speech instances P1 to P5 of the speaker A that is a specific speaker are subjected to voice recognition, and a result of the recognition is P1 "moratteta (I'd received it)", P2 "hachi-gatsu (August) sou-desune, de (yeah, so)", P3 "hai (Yes)", P4 "ee (Uh-huh)" and P5 "moushiwake arimasen (sorry)" Among these expressions, P5 is an apologizing expression and P3 and P4 are supportive responses. Therefore, a start time of P5 is a time $T_i$ and an end time of P2 is a time $T_i^{pre}$. Moreover, a time from the time $T_i^{pre}$ to the time $T_i$ is a time $t_i^{range}$. However, in the example shown in FIG. 4, $t_i^{range} < t^{MINIMUM\_RANGE}$ is established. Therefore, in the processing by the specific situation extraction unit 140, $t_i^{range}$ is replaced by $t^{MINIMUM\_RANGE}$.

With reference to FIG. 4, as to the speech time of each speaker within the time $t^{MINIMUM\_RANGE}$, a speech time $u_i^B$ of the speaker B is much longer than a speech time $u_i^A$ of the speaker A. Therefore, a score $S_i$ calculated by the above Equation (1) is set to have a large value.

The specific situation extraction unit 140 performs the above processing for the portion including each of the specific expressions detected from the voice data of the conversation unit. Then, the specific situation extraction unit 140 adds up all the scores $S_i$ to obtain a score which is the sum of the individual scores, $\Sigma S_i$, in the conversation unit and then terminates the processing, Step 310. The obtained score $\Sigma S_i$ and the scores $S_i$ are processed, as required, and outputted by the output unit 150 together with information on the time $T_i$ indicating a position in the conversation voice data.

As an application example of the voice analysis system according to an embodiment of the present invention, the voice analysis system is applied to the operation of monitoring conversation voices at a call center.

At the call center, a very large number of conversations take place every day between clients and agents. Thus, there is an increasing demand for monitoring to find useful information or problems from the large number of conversations. For example, in a conversation in which the client expresses his or her dissatisfaction or anger toward the agent, the cause of the dissatisfaction of the client can be found or an agent who often makes clients angry can be detected by making a close examination of the contents of the conversation.

However, since the number of the conversations taking place at the call center every day is very large, it is difficult for a person, e.g., supervisor, to listen to all the conversations and list useful conversations in which complaint responding situations actually occur. Therefore, by using the system according to an embodiment of the present invention to narrow the conversations down to the one to be monitored, efficiency of the monitoring operation can be improved. For example, the conversations are ranked based on the score for each conversation calculated in Step 310 of FIG. 3. The conversations are examined by the supervisor sequentially from the one having a higher score, e.g., one having a higher accuracy of occurrence of an actual complaint responding situation. Thus, an efficient monitoring operation is implemented.

Moreover, in an embodiment of the present invention, as shown in Step 309 of FIG. 3, the score is calculated not only for each conversation unit but also for each specific expression appearing in the conversation. Therefore, based on the score calculated for each specific expression, a portion in which a score equal to or higher than a certain threshold is calculated, for example, is extracted and presented to the supervisor. Thus, the efficiency of the monitoring operation can be further improved.

Although the embodiment of the present invention has been described above, the technical scope of the present invention is not limited to that described in the foregoing embodiment. For example, in the above embodiment, the portion of the conversation where the specific situation may have occurred is extracted based on only the specific expression given by the specific speaker, the speech pattern of each speaker, and the characteristic value or calculated score indicating the accuracy of the extraction. Meanwhile, the accuracy of occurrence of the specific situation can be calculated by combining the result of voice recognition for the speech of the specific speaker with the specific expression and speech pattern described above. For example, when an additional speech expression is further added to the specific expression or when an "adversative" expression such as "but" comes after the specific expression, a calculation equation may be established so as to obtain a different accuracy value, compared with the case where those speech expressions are not added to the calculation.

Moreover, in the above embodiment, the complaint responding situation is taken as an example of the specific situation, and the portion of the conversation where the complaint responding situation may have occurred is extracted by use of the speech pattern in which the speaking of the specific expression by the specific speaker appears after the biased state with more speaking done by the opposite speaker continues. However, this speech pattern is only one example.

As long as a speech pattern of each speaker, which frequently appears when a specific situation occurs, can be specified, occurrence of the specific situation may be determined based on a complex speech pattern in which speaking by the specific speaker and the opposite speaker are alternated.

Furthermore, in the above embodiment, the description was given of, as an example, the conversation between two speakers including the specific speaker and a different speaker. However, as long as a speech pattern of each speaker, which frequently appears when a specific situation occurs, can be specified, an embodiment of the present invention can also be applied to a conversation among three or more speakers including the specific speaker and many different speakers. It is apparent from the description of the scope of claims that embodiments to which various changes or modifications are added can also be included in the technical scope of the present invention.

The present invention thus configured makes it possible to automatically extract a location where a specific situation may have occurred in a conversation in a specific scene by analyzing voices of the conversation.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for extracting a specific situation in a conversation, comprising:
   a processor; and
   a memory with computer code instructions stored thereon, the processor and the memory, with the computer code instructions being configured to implement:

an acquisition unit for acquiring speech voice data of speakers in the conversation, the voice acquisition unit acquiring the voice data from at least one of recorded audio data and a telephone line, the speakers including a client and an agent;

a voice separation unit for identifying a specific speaker from the speech voice data of the conversation acquired by the acquisition unit, the specific speaker being one of the client and the agent;

a specific expression detection unit for detecting the speech voice data of a specific expression from speech voice data of the specific speaker in the conversation, the specific expression including at least one keyword; and a specific situation extraction unit for automatically identifying a speech pattern that includes speech voice data of the specific expression, extracting, from the speech voice data of the speakers in the conversation, a portion of the speech voice data that includes a combination of the speech pattern and the speech voice data of the specific expression detected by the specific expression detection unit and wherein characteristics of the speech pattern in the portion meet certain conditions, the specific situation extraction unit for further determining whether a portion of the conversation that includes the speech voice data of the specific expression forms the speech pattern according to a difference in speech time between (i) the specific expression spoken by the specific speaker and (ii) the speech segment immediately before the specific expression spoken by the specific speaker and presenting the extracted portion for analysis.

2. The system according to claim 1, wherein the speech pattern is based on characteristics of the speech voice data of the speakers in the conversation and the characteristics of the speech voice data are based on speaking time of each speaker in the conversation.

3. The system according to claim 1, wherein the specific situation extraction unit extracts from the speech voice data the portion of the conversation in a determined time range with respect to the specific expression.

4. The system according to claim 1, wherein the specific situation extraction unit obtains a quantitative characteristic value representing characteristics of the portion of the conversation that forms the speech pattern in the speech voice data.

5. The system according to claim 4, wherein the specific situation extraction unit obtains, as a characteristic value of a predetermined conversation unit, a total sum of the characteristic values obtained for the portions of the conversation included in the conversation unit.

6. The system according to claim 4, wherein the specific situation extraction unit obtains the characteristic value, based on a difference in speaking time between speaking time of the specific speaker and speaking time of a different speaker, for each speaker speaking before the speech voice data of the specific expression.

7. The system according to claim 1, further comprising:
an output unit for outputting a display of the result of extracting the portion of the speech voice data that forms a speech pattern.

8. A method implemented by a computing apparatus for extracting a specific situation by analyzing a conversation, the method comprising:
acquiring, by an acquisition unit, speech voice data of the speakers in the conversation, the voice acquisition unit acquiring the voice data from at least one of recorded audio data and a telephone line, the speakers including a client and an agent;

identifying, by a voice separation unit, a specific speaker from the speech voice data of the conversation acquired by the acquisition unit, the specific speaker being one of the client and the agent;

detecting, by a specific expression detection unit, the speech voice data of a specific expression from speech voice data of the specific speaker in the conversation, the specific expression including at least one keyword;

automatically identifying a speech pattern that includes speech voice data of the specific expression by determining whether a portion of the conversation that includes the speech voice data of the specific expression forms the speech pattern according to a difference in speech time between (i) the specific expression spoken by the specific speaker and (ii) the speech segment immediately before the specific expression spoken by the specific speaker;

extracting, by a specific extraction unit, a portion of the speech voice data that includes a combination of the speech pattern and the speech voice data of the specific expression from the speech voice data of the speakers in the conversation and wherein characteristics of the speech pattern in the portion meet certain conditions, thereby extracting the specific situation by analyzing the conversation by the computing apparatus; and presenting the extracted portion for analysis.

9. The method according to claim 8, wherein automatically identifying a speech pattern by the specific extraction unit includes:
forming the pattern based on characteristics of speech voice data of the speakers in the conversation; and basing the characteristics of the speech voice data on speaking time of each speaker in the conversation.

10. The method according to claim 8, further including:
extracting a portion of the conversation from the speech voice data in a determined time range with respect to the specific expression.

11. The method according to claim 8, wherein extracting by the specific extraction unit includes:
obtaining a quantitative characteristic value representing characteristics of the portion of the conversation that forms the speech pattern in the speech voice data.

12. The method according to claim 11, further including:
obtaining, as a characteristic value of a predetermined conversation unit, a total sum of the characteristic values obtained for the portions of the conversation included in the conversation unit.

13. The method according to claim 11, wherein the characteristic value is based on a difference in speaking time between speaking time of the specific speaker and speaking time of a different speaker, for each speaker speaking before the speech voice data of the specific expression.

14. The method according to claim 8, further comprising:
outputting, by an output unit, a display of the result of extracting the portion of the speech voice data that forms a speech pattern.

15. A non-transitory computer readable storage device storing computer readable instructions which, when executed, cause a computer device to implement a method of extracting a specific situation by analyzing a conversation, the method comprising:
acquiring, by an acquisition unit, speech voice data of the speakers in the conversation, the acquisition unit acquiring the voice data from at least one of recorded audio data and a telephone line, the speakers including a client and an agent;

identifying, by a voice separation unit, a specific speaker from the speech voice data of the conversation acquired by the acquisition unit, the specific speaker being one of the client and the agent;

detecting, by a specific expression detection unit, the speech voice data of a specific expression from speech voice data of the specific speaker in the conversation, the specific expression including at least one keyword;

automatically identifying a speech pattern that includes the speech voice data of the specific expression by determining whether a portion of the conversation that includes the speech voice data of the specific expression forms the speech pattern according to a difference in speech time between (i) the specific expression spoken by the specific speaker and (ii) the speech segment immediately before the specific expression spoken by the specific speaker;

extracting, by a specific extraction unit, from the speech voice data of the speakers in the conversation, a portion of the speech voice data that includes a combination of the speech pattern and the speech voice data of the specific expression and wherein characteristics of the speech pattern in the portion meet certain conditions, thereby extracting the specific situation by analyzing the conversation by the computing apparatus; and presenting the extracted portion for analysis; and detecting, by a specific expression detection unit, the speech voice data of a specific expression from speech voice data of specific speaker in the conversation.

\* \* \* \* \*